United States Patent
Liu et al.

(10) Patent No.: US 10,110,349 B2
(45) Date of Patent: Oct. 23, 2018

(54) RATE DEMATCHING METHOD, APPARATUS AND RECEIVING-SIDE DEVICE

(71) Applicants: ZTE CORPORATION, Guangdong (CN); SANECHIPS TECHNOLOGY CO., LTD., Shenzhen (CN)

(72) Inventors: Tao Liu, Guangdong (CN); Haitao Yang, Guangdong (CN)

(73) Assignees: ZTE CORPORATION, Guangdong (CN); SANECHIPS TECHNOLOGY CO., LTD., Shenzhen (CN)

( * ) Notice: Subject to any disclaimer, the term of this patent is extended or adjusted under 35 U.S.C. 154(b) by 111 days.

(21) Appl. No.: 15/109,200

(22) PCT Filed: Jun. 10, 2014

(86) PCT No.: PCT/CN2014/079621
§ 371 (c)(1),
(2) Date: Jun. 30, 2016

(87) PCT Pub. No.: WO2014/187407
PCT Pub. Date: Nov. 27, 2014

(65) Prior Publication Data
US 2016/0329990 A1  Nov. 10, 2016

(30) Foreign Application Priority Data

Dec. 31, 2013  (CN) .......................... 2013 1 0754083

(51) Int. Cl.
*H04B 1/10* (2006.01)
*H04L 1/00* (2006.01)
*H04L 1/18* (2006.01)

(52) U.S. Cl.
CPC .......... *H04L 1/0067* (2013.01); *H04L 1/0071* (2013.01); *H04L 1/1812* (2013.01)

(58) Field of Classification Search
CPC ....... H04B 3/32; H04B 3/23; H04L 25/03343; H04L 25/497; H04L 25/03057
(Continued)

(56) References Cited

U.S. PATENT DOCUMENTS 4,291,406 A * 9/1981 Bahl ..................... H04L 1/0054
714/787
5,781,133 A * 7/1998 Tsang ..................... G06T 9/005
341/59
(Continued)

FOREIGN PATENT DOCUMENTS

| CN | 102546082 | 7/2012 |
|---|---|---|
| CN | 102594490 | 7/2012 |

OTHER PUBLICATIONS

International Search Report for PCT/CN2014/079621 dated Oct. 10, 2014, 4 pages.

*Primary Examiner* — James M Perez
(74) *Attorney, Agent, or Firm* — Nixon & Vanderhye P.C.

(57) ABSTRACT

The present disclosure discloses a rate dematching method, device and receiving-side apparatus-. The method includes: acquiring new data to be processed, executing bit recovery/bit separation based on the new data to be processed, and writing data obtained after bit recovery/bit separation into a code block data memory; conducting sub-block deinterleaving processing on data stored in the code block data memory; and conducting hybrid automatic repeat request (HARQ) combination processing on output data after sub-block deinterleaving processing and acquired history data to be processed, and outputting HARQ combination results.

12 Claims, 12 Drawing Sheets

(58) Field of Classification Search
USPC .................................. 375/259–285, 316–352
See application file for complete search history.

(56) References Cited

U.S. PATENT DOCUMENTS

| | | | | |
|---|---|---|---|---|
| 6,473,467 | B1* | 10/2002 | Wallace | H04B 7/0417 375/267 |
| 6,735,180 | B1* | 5/2004 | Malkamaki | H04L 1/0025 370/282 |
| 6,771,706 | B2* | 8/2004 | Ling | H04B 7/0417 375/260 |
| 7,002,900 | B2* | 2/2006 | Walton | H04B 7/0669 370/208 |
| 7,058,079 | B1* | 6/2006 | Gicquel | H04B 3/20 370/329 |
| 7,126,928 | B2* | 10/2006 | Tiedemann, Jr. | H04L 1/0002 370/329 |
| 7,313,190 | B2* | 12/2007 | Balakrishnan | H03M 13/2707 375/260 |
| 8,068,548 | B1* | 11/2011 | Chen | H04L 1/0031 375/261 |
| 8,165,018 | B2* | 4/2012 | Jia | H04B 7/0417 370/229 |
| 8,320,496 | B2* | 11/2012 | Li | H03M 13/136 375/259 |
| 8,473,301 | B2* | 6/2013 | Chen | G10L 21/038 704/262 |
| 8,526,312 | B2* | 9/2013 | Xiao | H04L 1/0054 370/241 |
| 8,619,896 | B2* | 12/2013 | Chen | H04L 1/0031 375/284 |
| 8,670,378 | B2* | 3/2014 | Liu | H04B 1/7103 370/328 |
| 8,831,129 | B2* | 9/2014 | Chen | H04L 1/0031 375/284 |
| 9,048,877 | B2* | 6/2015 | Wang | H03M 13/2775 |
| 9,461,775 | B2* | 10/2016 | Chen | H04L 1/0031 |
| 9,819,445 | B1* | 11/2017 | Patel | H04L 1/0041 |
| 9,853,773 | B2* | 12/2017 | Chen | H04L 1/0031 |
| 2002/0009157 | A1* | 1/2002 | Sipola | H04L 1/0069 375/295 |
| 2002/0199153 | A1* | 12/2002 | Fall | H03M 13/00 714/781 |
| 2003/0043928 | A1* | 3/2003 | Ling | H04B 7/0417 375/267 |
| 2003/0112880 | A1* | 6/2003 | Walton | H04B 7/0417 375/260 |
| 2004/0017860 | A1* | 1/2004 | Liu | H04L 1/0003 375/299 |
| 2005/0058089 | A1* | 3/2005 | Vijayan | H04B 7/12 370/312 |
| 2005/0068921 | A1* | 3/2005 | Liu | H04B 7/2637 370/335 |
| 2005/0107036 | A1* | 5/2005 | Song | H04L 1/0009 455/23 |
| 2005/0135308 | A1* | 6/2005 | Vijayan | H04L 5/0007 370/330 |
| 2005/0160347 | A1* | 7/2005 | Kim | H03M 13/271 714/776 |
| 2005/0216821 | A1* | 9/2005 | Harada | H03M 13/1102 714/801 |
| 2006/0088007 | A1* | 4/2006 | Jalali | H04L 5/023 370/334 |
| 2006/0195752 | A1* | 8/2006 | Walker | H04L 1/0045 714/748 |
| 2007/0019753 | A1* | 1/2007 | Kim | H03M 13/25 375/260 |
| 2007/0165729 | A1* | 7/2007 | Ha | H04L 1/0065 375/260 |
| 2008/0130510 | A1* | 6/2008 | Cho | H04L 1/0045 370/252 |
| 2008/0186843 | A1* | 8/2008 | Ma | H04L 1/0003 370/210 |
| 2008/0287155 | A1* | 11/2008 | Xu | H04L 5/0007 455/522 |
| 2008/0301536 | A1* | 12/2008 | Shin | H04L 1/0043 714/786 |
| 2008/0310526 | A1* | 12/2008 | Maltsev | H04L 27/2628 375/260 |
| 2008/0317146 | A1* | 12/2008 | Kwon | H04L 1/0071 375/260 |
| 2009/0086849 | A1* | 4/2009 | Tsai | H04L 1/1819 375/298 |
| 2009/0113274 | A1* | 4/2009 | Lee | H03M 13/27 714/776 |
| 2009/0158130 | A1* | 6/2009 | Cheun | H03M 13/2978 714/786 |
| 2009/0219911 | A1* | 9/2009 | Blankenship | H04L 1/0042 370/345 |
| 2009/0225894 | A1* | 9/2009 | Yoshii | H04L 1/0066 375/295 |
| 2009/0296850 | A1* | 12/2009 | Xu | H03M 13/136 375/295 |
| 2010/0008438 | A1* | 1/2010 | Kao | H04L 1/0041 375/261 |
| 2010/0027704 | A1* | 2/2010 | Ho | H04L 1/0041 375/267 |
| 2010/0054358 | A1* | 3/2010 | Ko | H04B 7/0639 375/267 |
| 2010/0062705 | A1* | 3/2010 | Rajkotia | H04K 3/224 455/1 |
| 2010/0098185 | A1* | 4/2010 | Miyazaki | H04B 7/0669 375/267 |
| 2010/0158053 | A1* | 6/2010 | Kim | H04L 1/0052 370/536 |
| 2010/0169738 | A1* | 7/2010 | Wu | H04L 1/0042 714/752 |
| 2010/0235721 | A1* | 9/2010 | Bukris | G06F 11/10 714/786 |
| 2010/0241935 | A1* | 9/2010 | Ancora | H03M 13/2957 714/807 |
| 2010/0246712 | A1* | 9/2010 | Suo | H04B 7/0617 375/295 |
| 2010/0287452 | A1* | 11/2010 | Xu | H04L 1/1835 714/786 |
| 2010/0296603 | A1* | 11/2010 | Lee | H04L 1/0071 375/295 |
| 2010/0303016 | A1* | 12/2010 | Jin | H04L 27/0008 370/328 |
| 2010/0313083 | A1* | 12/2010 | Garani | H03M 13/27 714/702 |
| 2010/0323713 | A1* | 12/2010 | Liu | H04B 1/7103 455/452.2 |
| 2011/0033004 | A1* | 2/2011 | Wang | H04L 27/2626 375/261 |
| 2011/0119553 | A1* | 5/2011 | Gunnam | H03M 13/6331 714/752 |
| 2011/0182385 | A1* | 7/2011 | Doan | H03M 13/3738 375/340 |
| 2011/0194551 | A1* | 8/2011 | Lee | H04B 7/0626 370/342 |
| 2012/0002657 | A1* | 1/2012 | Seyama | H04L 1/1854 370/338 |
| 2012/0033752 | A1* | 2/2012 | Yoshii | H03M 13/258 375/260 |
| 2012/0051307 | A1* | 3/2012 | Huang | H04L 5/0007 370/329 |
| 2012/0076043 | A1* | 3/2012 | Nishio | H04L 1/1861 370/252 |
| 2012/0106662 | A1* | 5/2012 | Miyazaki | H04L 1/0067 375/259 |
| 2012/0151302 | A1* | 6/2012 | Luby | H04N 21/4331 714/776 |
| 2012/0195282 | A1* | 8/2012 | Choi | H04L 5/0007 370/329 |
| 2012/0263156 | A1* | 10/2012 | Abraham | H04L 5/0023 370/338 |
| 2012/0281542 | A1* | 11/2012 | Xiao | H04L 1/0054 370/241 |

(56) References Cited

U.S. PATENT DOCUMENTS

| | | | |
|---|---|---|---|
| 2012/0320951 A1* | 12/2012 | Han | H04L 1/0041 375/141 |
| 2013/0013970 A1* | 1/2013 | Tao | H04L 1/1835 714/748 |
| 2013/0114766 A1* | 5/2013 | Mueller-Weinfurtner | H03M 13/3994 375/341 |
| 2013/0145239 A1* | 6/2013 | Pi | H04L 1/0003 714/807 |
| 2013/0148614 A1* | 6/2013 | Noh | H04L 5/001 370/329 |
| 2013/0155832 A1* | 6/2013 | Yang | H04L 1/0026 370/203 |
| 2013/0198592 A1* | 8/2013 | Wang | H03M 13/2775 714/786 |
| 2014/0376469 A1* | 12/2014 | Zhang | H04L 1/1845 370/329 |
| 2016/0056922 A1* | 2/2016 | Baek | H04B 7/046 375/267 |
| 2016/0278025 A1* | 9/2016 | Wang | H04W 52/0235 |
| 2016/0329990 A1* | 11/2016 | Liu | H04L 1/0067 |
| 2017/0005754 A1* | 1/2017 | Chen | H04L 1/0031 |

* cited by examiner $N = K/2 + 2, \ N[2:0] = 6$

| s_up | s_down | p1_up | p1_down | p2_up | p2_down |
|---|---|---|---|---|---|
| 0~7 | N~N+7 | 0~7 | N~N+7 | 0~7 | N~N+7 |
| 8~15 | N+8~N+15 | 8~15 | N+8~N+15 | 8~15 | N+8~N+15 |
| 16~23 | N+16~N+23 | 16~23 | N+16~N+23 | 16~23 | N+16~N+23 |
| 24~31 | N+24~N+31 | 24~31 | N+24~N+31 | 24~31 | N+24~N+31 |
| ... | ... | ... | ... | ... | ... |
| ... | ... | ... | ... | ... | ... |
| N-2~N-1 | 2N-2~2N-1 | N-2~N-1 | 2N-2~2N-1 | N-2~N-1 | 2N-2~2N-1 |

| sys_up | sys_down | p1_up | | p1_down | | p2_up | | p2_down | |
|---|---|---|---|---|---|---|---|---|---|
| 0 | M | 2M | 2M+1 | 4M-1 | 4M | 2M | 2M+1 | 4M-1 | 4M |
| 1 | M+1 | 2M+2 | 2M+3 | 4M+1 | 4M+2 | 2M+2 | 2M+3 | 4M+1 | 4M+2 |
| 2 | M+2 | 2M+4 | 2M+5 | 4M+3 | 4M+4 | 2M+4 | 2M+5 | 4M+3 | 4M+4 |
| 3 | M+3 | 2M+6 | 2M+7 | 4M+5 | 4M+6 | 2M+6 | 2M+7 | 4M+5 | 4M+6 |
| ... | ... | ... | ... | ... | ... | ... | ... | ... | ... |
| ... | ... | ... | ... | ... | ... | ... | ... | ... | ... |
| M-1 | 2M-1 | 4M-2 | | 6M-3 | | 4M-2 | | 6M-3 | |

$N = K/2 + 2, \ N[2:0] = 2, M = \lceil N/8 \rceil$

Figure 13

| sys_up | sys_down | p1_up | | p1_down | | p2_up | | p2_down | |
|---|---|---|---|---|---|---|---|---|---|
| 0 | M | 2M | 2M+1 | 4M | 4M+1 | 2M | 2M+1 | 4M | 4M+1 |
| 1 | M+1 | 2M+2 | 2M+3 | 4M+2 | 4M+3 | 2M+2 | 2M+3 | 4M+2 | 4M+3 |
| 2 | M+2 | 2M+4 | 2M+5 | 4M+4 | 4M+5 | 2M+4 | 2M+5 | 4M+4 | 4M+5 |
| 3 | M+3 | 2M+6 | 2M+7 | 4M+6 | 4M+7 | 2M+6 | 2M+7 | 4M+6 | 4M+7 |
| ... | ... | ... | ... | ... | ... | ... | ... | ... | ... |
| ... | ... | ... | ... | ... | ... | ... | ... | ... | ... |
| M-1 | 2M-1 | 4M-2 | 4M-1 | 6M-2 | 6M-1 | 4M-2 | 4M-2 | 6M-2 | 6M-1 |

$N = K/2 + 2, \ N[2:0] = 6, M = \lceil N/8 \rceil$

| Column number before puncturing | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| No 4 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 4 | 4 | 4 | 4 | 4 | 4 | 4 | 4 |
| No 12 | 1 | 1 | 2 | 2 | 3 | 3 | 3 | 3 | 4 | 4 | 5 | 5 | 6 | 6 | 6 | 6 | 7 | 7 | 8 | 8 | 9 | 9 | 9 | 9 | 10 | 10 | 11 | 11 | 12 | 12 | 12 | 12 |
| No 20 | 1 | 2 | 3 | 3 | 4 | 4 | 5 | 5 | 6 | 7 | 8 | 8 | 9 | 9 | 10 | 10 | 11 | 12 | 13 | 13 | 14 | 14 | 15 | 15 | 16 | 17 | 18 | 18 | 19 | 19 | 20 | 20 |
| No 28 | 1 | 2 | 3 | 4 | 5 | 6 | 7 | 7 | 8 | 9 | 10 | 11 | 12 | 13 | 14 | 14 | 15 | 16 | 17 | 18 | 19 | 20 | 21 | 21 | 22 | 23 | 24 | 25 | 26 | 27 | 28 | 28 |

Figure 15

| Column number after puncturing | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| No 4 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 3 | 3 | 3 | 3 | 3 | 3 | 3 | 3 |
| No 12 | 1 | 1 | 2 | 2 | 3 | 3 | 3 | 3 | 4 | 4 | 5 | 5 | 6 | 6 | 6 | 6 | 7 | 7 | 8 | 8 | 9 | 9 | 9 | 9 | 10 | 10 | 11 | 11 | 11 | 11 | 11 | 11 |
| No 20 | 1 | 2 | 3 | 3 | 4 | 4 | 5 | 5 | 6 | 7 | 8 | 8 | 9 | 9 | 10 | 10 | 11 | 12 | 13 | 13 | 14 | 14 | 15 | 15 | 16 | 17 | 18 | 18 | 19 | 19 | 19 | 19 |
| No 28 | 1 | 2 | 3 | 4 | 5 | 6 | 7 | 7 | 8 | 9 | 10 | 11 | 12 | 13 | 14 | 14 | 15 | 16 | 17 | 18 | 19 | 20 | 21 | 21 | 22 | 23 | 24 | 25 | 26 | 27 | 27 | 27 |

Figure 16

| Column number before puncturing | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| Column number after puncturing | 0 | 1 | 8 | 2 | 4 | 2 | 1 | 2 | 2 | 1 | 1 | 2 | 6 | 3 | 3 | 1 | 1 | 9 | 2 | 5 | 2 | 1 | 2 | 3 | 1 | 1 | 2 | 7 | 2 | 1 | 3 |
|  |   |   | 8 |   | 4 |   | 0 | 2 | 8 | 8 | 0 | 6 | 2 | 4 | 0 |   | 7 |   | 5 |   | 1 | 3 | 9 |   | 9 | 1 | 7 |   | 3 | 5 | 1 |
| 15? | No | Yes | No | Yes | No | Yes | No | Yes | No | Yes | No | Yes | No | Yes | No | Yes | No | Yes | No | Yes | No | Yes | No | Yes | No | Yes | No | Yes | No | Yes | No | Yes |

Figure 17

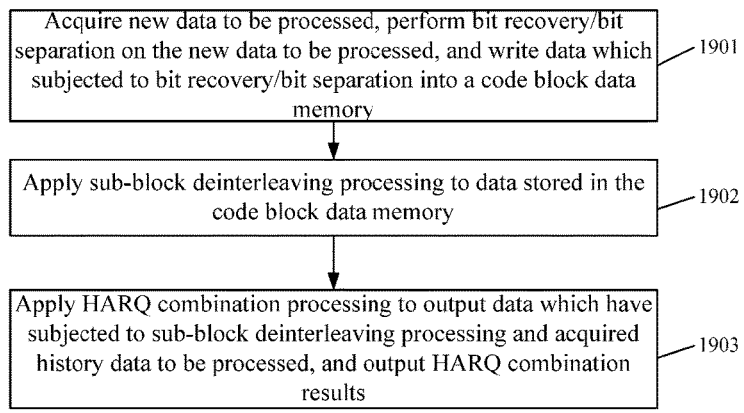

Figure 18

```
Acquire new data to be processed, perform bit recovery/bit
separation on the new data to be processed, and write data which    ⎯1901
subjected to bit recovery/bit separation into a code block data
                          memory Apply sub-block deinterleaving processing to data stored in the
              code block data memory                                ⎯1902

Apply HARQ combination processing to output data which have
 subjected to sub-block deinterleaving processing and acquired      ⎯1903
   history data to be processed, and output HARQ combination
                         results
```

Figure 19

RATE DEMATCHING METHOD, APPARATUS AND RECEIVING-SIDE DEVICE

CROSS-REFERENCES TO RELATED APPLICATIONS

This application is a U.S. national phase application of co-pending international patent application No. PCT/CN2014/079621, filed on Jun. 10, 2014 which claims priority to a Chinese patent application No. 201310754083.9 filed on Dec. 31, 2013, disclosures of both of which are incorporated herein by reference in their entireties.

TECHNICAL FIELD

The present disclosure relates to a field of communications, and particularly to a rate dematching method, apparatus and a receiving-side device.

BACKGROUND

A Long Term Evolution (LTE) is an evolution of a 3rd-Generation mobile communication (3G) technology. LTE improves and enhances the air access technology of 3G. A new generation wireless networks based on orthogonal frequency division multiplexing (OFDM) and multiple-input multiple-output (MIMO) technologies can provide a peak rate of 100 Mbit/s in downlink and 50 Mbit/s in uplink under a spectral bandwidth of 20 MHZ, thereby improving the performance of cell edge users, increasing the cell capacity and spectrum utilization ratio and reducing the system delay. According to a technical standard 3GPP TS36.211/3GPP TS36.212 protocol file of the LTE, for the uplink and downlink traffic channels of the LTE, as shown in FIG. 1, a processing flow of a transmitting side (for a downlink traffic channel, the transmitting side is an eNodeB, and for an uplink traffic channel, the transmitting side is a user equipment CUE)) includes cyclic redundancy check (CRC) 101, code block segmentation 102, Turbo encoding 103, rate matching 104, code block cascading 105, scrambling 106, modulation 107, layer mapping 108, pre-coding 109, resource mapping 110 and OFDM symbol generation 111. As shown in FIG. 2, receiving processing flow of a receiving side (for the downlink traffic channel, the receiving side is an eNodeB, and for the uplink traffic channel, the receiving side is UE) includes reception of antenna data 201, demodulation of OFDM symbol 202, demodulation of MIMO 203, demodulation 204, descrambling 205, de-codeblock decascading 206, rate dematching 207, hybrid automatic repeat request (HARQ) combination 208, decoding 209, de-CRC 210, etc.

Each code block corresponds to one rate matching process, and the input of each rate matching is the output of the Turbo encoding, i.e., parallel three branches: $d_k^{(0)}$, $d_k^{(1)}$ and $d_k^{(2)}$ (k=0, ..., K-1). As shown in FIG. 3, the rate matching process structurally includes three interleaver sub-processes for respectively processing the three branches, one bit collection sub-process for summarization and one bit selection and clipping sub-process. Three branches of data are read into respectively independent sub-block interleavers in rows, NULL elements are filled in the front of an interleaving matrix with R rows and 32 columns, and data are read out in columns exchanged in columns. Then, the three branches of interleaved data $v_k^{(0)}$, $v_k^{(1)}$ and $v_k^{(2)}$ (k=0, ..., K-1) are summarized to a bit collection module, and the first branch of data is input in sequence, and the second branch of data and the third branch of data are alternately placed. Finally, beginning from k0, the NULL elements of the data in the bit collection module are skipped, and e valid data are selected in sequence as the output of the rate matching.

Rate dematching is a reverse process of the rate matching, and as shown in FIG. 4, a traditional rate dematching method includes bit recovery, bit separation and sub-block deinterleaving. The three processes are specifically realized as follows.

Bit recovery includes:

1. the following parameters are calculated: the length of each code block, the number $N_d$ of NULL elements added in a sub-block interleaving of the rate matching, the length $N_{cb}$ of a circulating cache, positions of the NULL elements in the circulating cache, a starting address $k_0$ of rate matching output, and the number e of physical channel bits of the code block;

2. starting from address $k_0$, data of an input sequence are input to the circulating cache in sequence; if a current address corresponds a NULL element, 0 is written into the circulating cache, otherwise, input data are written into the circulating cache; and when the address is increased to $N_{cb}$, the address is returned to 0; and 3. according to e and $N_{cb}$, a de-repetition or de-punching process, i.e., an reverse process of bit selection and clipping of the rate matching, is performed; wherein the de-repetition is combining data repeatedly sent in bit selection and clipping, and the de-punching is recovering data removed in bit selection and clipping to 0.

The bit separation corresponds to the bit collection of the rate matching. Data that have been subjected to bit recovery are read out of the circulating cache in sequence, and separated into three sub-blocks, wherein the first R×32 data are written into a sub-block interleaver S, and the last 2R×32 data are alternately written into a sub-block de-interleaver P1 and a sub-block de-interleaver P2, and R is the number of rows of an interleaving matrix.

In sub-block deinterleaving, data of three sub-blocks are respectively input in columns, switched in columns, and then output in rows, and the NULL elements added in sub-block interleaving are deleted when data are output.

Rate dematching methods for LTE in an existing technology have problems of complex processing, huge hardware resource consumption and long processing time.

This section provides background information related to the present disclosure which is not necessarily prior art.

This section provides a summary of various of implementations or examples of the technology described in the disclosure, and is not a comprehensive disclosure of the full scope or all features of the disclosed technology.

SUMMARY

To solve the above-mentioned technical problems, embodiments of the present disclosure provide a rate dematching method, apparatus, and receiving-side device.

Embodiments of the present disclosure provide a rate dematching method, including:

acquiring new data to be processed, performing bit recovery/bit separation on the new data to be processed, and writing data which have been subjected to bit recovery/bit separation into a code block data memory;

applying sub-block deinterleaving processing to data stored in the code block data memory; and applying hybrid automatic repeat request (HARQ) combination processing on output data which have been subjected to sub-block deinterleaving processing and the acquired history data to be processed, and outputting HARQ combination results.

The performing bit recovery/bit separation on the new data to be processed and writing data which have been subjected to bit recovery/bit separation into a code block data memory include:

when processing each code block, firstly zero clearing the code block data memory, then reading data from the code block data memory, combining data read from the code block memory and the new data acquired, applying bit separation to combined data, and writing data which have been subjected to bit separation into the code block data memory.

The code block data in the code block memory are stored in three branches which comprise system bits, a first parity bit and a second parity bit, and each branch of data is stored into two sub-memories according to a sequence in an interleaving matrix which has been subjected to the bit separation, that is, a first half part of each branch of data which have been subjected to bit separation is stored into one sub-memory, a second half part of each branch of data which have been subjected to bit separation is stored into another sub-memory, and the three branches of data are stored in a total of six sub-memories.

The sub-block deinterleaving processing includes: calculating a sequence of the output data which have been subjected to sub-block interleaving, to obtain an address of the output data in the code block data memory, and reading data.

Embodiments of the present disclosure also provide a rate dematching apparatus including:

a parameter processing and controlling module, configured to acquire a task parameter, parse and process the task parameter and distribute the task parameters to other modules;

a new data input module, configured to acquire and cache new data to be processed;

a de-repetition/de-punching module, configured to perform bit recovery/bit separation on the new data to be processed, and write data which have been subjected to bit recovery/bit separation into a code block data memory;

the code block data memory, configured to store the data which have been subjected to bit recovery/bit separation;

a sub-block deinterleaving module, configured to apply sub-block deinterleaving processing to data stored in the code block data memory;

a hybrid automatic repeat request (HARQ) data input module, configured to acquire and cache history data to be processed;

an HARQ combination module, configured to combine data output by the sub-block deinterleaving module and the history data output by the HARQ data input module; and an HARQ data output module, configured to cache and output HARQ combination results.

The performing the bit recovery/bit separation on the new data to be processed and writing data which have been subjected to bit recovery/bit separation into the code block data memory include:

when processing each code block, by the de-repetition/de-punching module, firstly zero clearing the code block data memory, then reading data from the new data input module and the code block data memory simultaneously, and applying bit separation to combined data, and writing data which have been subjected to bit separation into the code block data memory.

The code block data memory is configured to store code block data in three branches which comprise system bits, a first parity bit and a second parity bit, and each branch of data is stored into two sub-memories according to a sequence in the interleaving matrix which has been subjected to the bit separation, that is, a first half part of each branch of data which have been subjected to bit separation is stored into one sub-memory, a second half part of each branch of data which have been subjected to bit separation is stored into another sub-memory, and the three branches of data are stored in a total of six sub-memories.

The sub-block deinterleaving module is configured to calculate the sequence of the output data which have been subjected to sub-block interleaving according to the sequence of output data, to obtain the address of the output data in the code block data memory, and read data.

Embodiments of the present disclosure also provide a receiving-side device for data communication, including the rate dematching apparatus of any one of the above-mentioned embodiments.

Embodiments of the present disclosure also provide a non-transitory computer readable storage medium, including a set of computer executable instructions for executing the method of any one of the above-mentioned rate dematching method of present disclosure.

A rate dematching method, apparatus and a receiving-side device provided in embodiments of the present disclosure simplify processing complexity, reduce hardware resource consumption, and improve work efficiency.

BRIEF DESCRIPTION OF DRAWINGS

FIG. 7 is a diagram showing stored symbols of all sub-RAMs of a code block data memory when a code block size is even time of 8 in an embodiment of the present disclosure;

FIG. 11 is a position diagram showing NULL elements before and after column transformation of system bits and a first parity bit data when nd=20 and R=4 in an embodiment of the present disclosure;

FIG. 12 is a position diagram showing NULL elements before and after column transformation of a second parity bit data when nd=20 and R=4 in an embodiment of the present disclosure;

FIG. 13 is a storage structure diagram showing addressing of all sub-RAMs according to a processing unit when the last three least significant bits (LSBs) of a number of valid symbols of sub-RAMs is 2 in an embodiment of the present disclosure;

FIG. 14 is a storage structure diagram showing addressing of all sub-RAMs according to a processing unit when the last three LSBs of a number of valid symbols of sub-RAMs is 6, in an embodiment of the present disclosure;

FIG. 15 is a diagram showing a relationship among a correction factor, a column number and $N_D$, in sub-block deinterleaving of system bits and a first parity bit in an embodiment of the present disclosure;

FIG. 16 is a diagram showing a relationship among a correction factor, a column number and $N_D$, in in sub-block deinterleaving of a second parity bit in an embodiment of the present disclosure;

FIG. 17 is a diagram showing column numbers of all columns before and after sub-block interleaving of system bits and a first parity bit in an embodiment of the present disclosure;

FIG. 18 a diagram showing column numbers of all columns before and after sub-block interleaving of a second parity bit in an embodiment of the present disclosure; and FIG. 19 is a second processing flow diagram showing a rate dematching method in an embodiment of the present disclosure.

DETAILED DESCRIPTION

A technical solution of the present disclosure is described in detail below in combination with the drawings and the specific embodiments.

Embodiments of the present disclosure provide an apparatus and method for realizing rate dematching including HARQ combination for an LTE traffic channel. In the embodiments, rate matching parameters and HARQ combination parameters of a transmission block (TB) are sent to the device by a system; the device reads new data to be processed and history data from the system through a data bus, and writes out HARQ combination results; and each data soft symbol occupies one byte.

Figure 1:
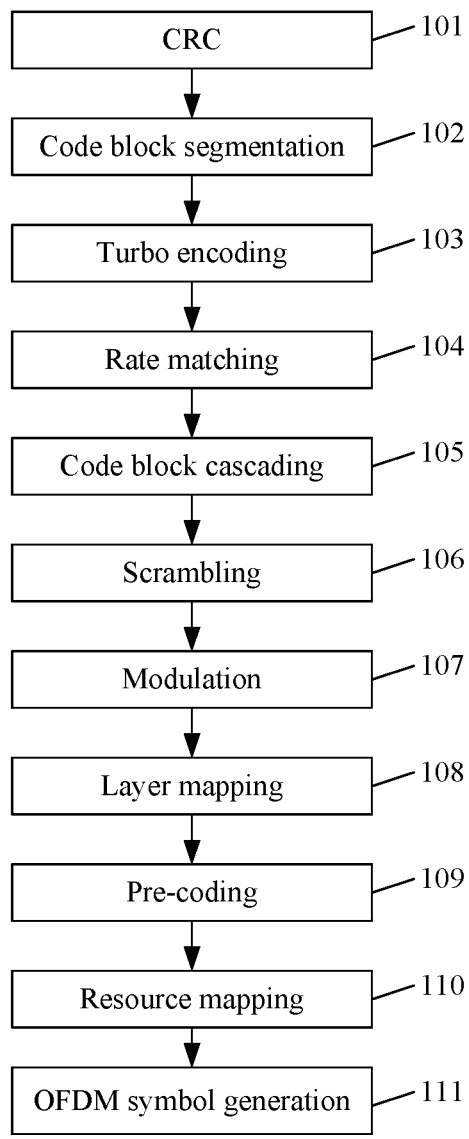
FIG. 1 is a flow diagram showing a data processing of a transmitting side of an LTE traffic channel in the existing technology.
Figure 2:
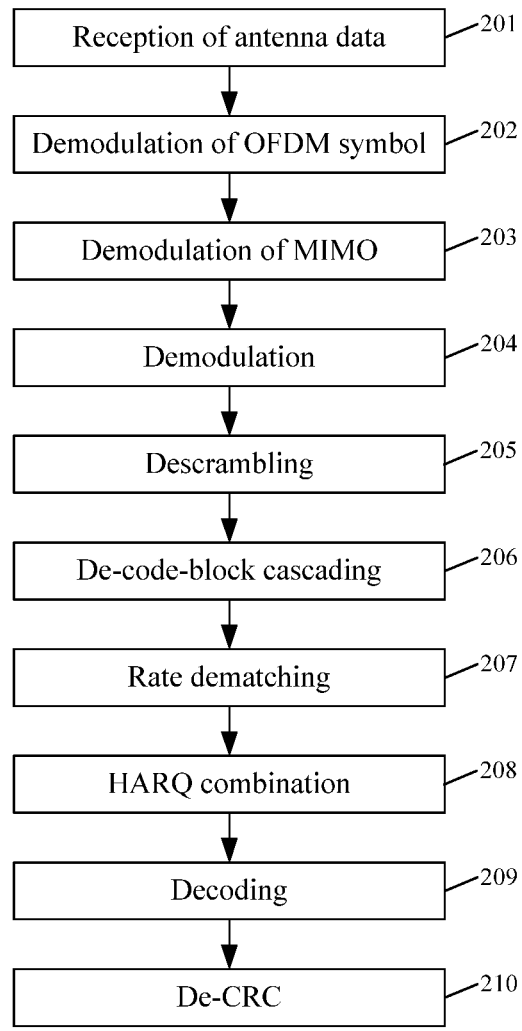
FIG. 2 is a flow diagram showing a data processing of a receiving side of an LTE traffic channel in the existing technology.
Figure 3:
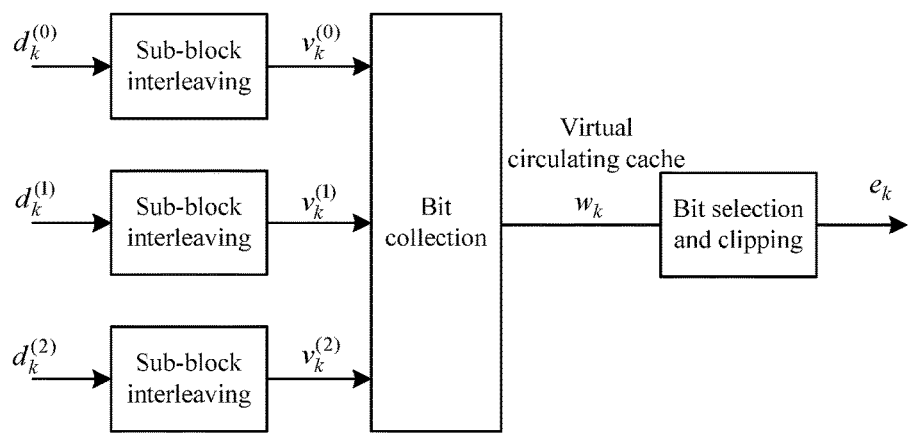
FIG. 3 is a processing diagram showing rate matching of a transmitting side of an LTE traffic channel in the existing technology.
Figure 4:
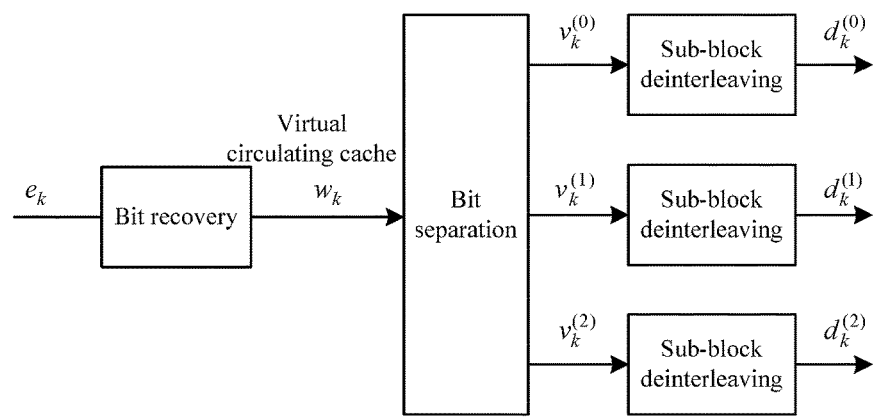
FIG. 4 is a processing diagram showing rate dematching of a receiving side of an LTE traffic channel in the existing technology.
Figure 5:
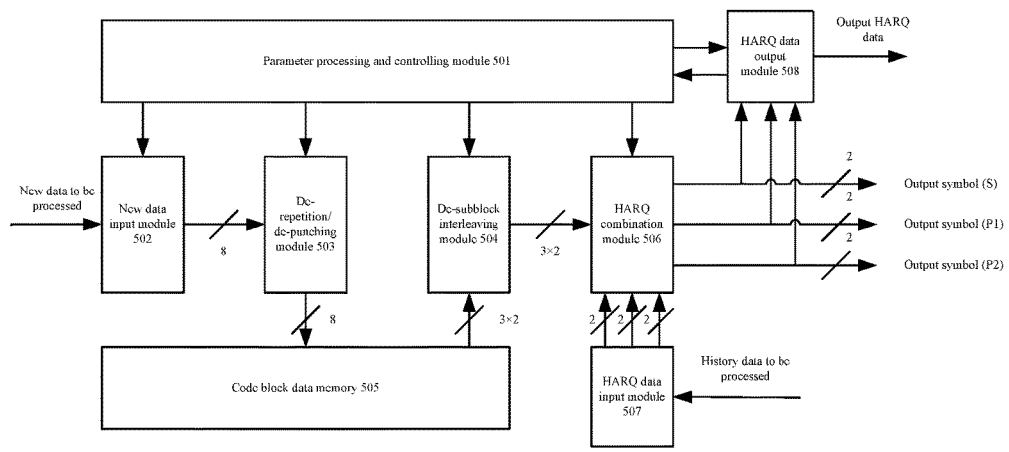
FIG. 5 is a structure diagram showing a rate dematching apparatus in an embodiment of the present disclosure.

As shown in FIG. 5, a rate dematching apparatus in an embodiment of the present disclosure includes a parameter processing and controlling module 501, a new data input module 502, de-repetition/de-punching module 503, sub-block deinterleaving module 504, a code block data memory 505, HARQ combination module 506, HARQ data input module 507 and HARQ data output module 508.

The parameter processing and controlling module 501 is configured to acquire and distribute task parameters. The task parameters are in unit of TB. Further, the parameter processing and controlling module 501 parses the task parameters, divide the task parameters into code blocks (CB), and distribute the CBs to each of other modules.

The new data input module 502 is configured to acquire and cache new data to be processed. NULL elements are not included in the new data. Further, the new data input module 502 reads data from outside through the data bus. A cache is set in the new data input module 502, and the cache mechanism is first input first output (FIFO). The new data input module 502 may read data by packets, and take data to process while reading, so that fewer storage resources are required.

The de-repetition/de-punching module 503 is configured to perform bit recovery/bit separation. When processing each code block, the de-repetition/de-punching module 503 firstly clears the code block data memory, then reads data from the new data input module 502 and a code block data memory 505 simultaneously, combines data read from the new data input module 502 and a code block data memory 505, applies bit separation to combined data, and writes data which have been subjected to bit separation into the code block data memory 505. The de-repetition/de-punching module 503 adopts a 8-symbol parallel processing, naturally completes de-repetition/de-punching in a process of combination and writing data into the code block data memory 505, and the NULL elements are not required to be recovered.

The sub-block deinterleaving module 504 is configured to apply sub-block deinterleaving. The sub-block deinterleaving module 504 calculates a sequence of output data which have been subjected to sub-block interleaving and reads three branches of data, i.e. system bits, a first parity bit and a second parity bit from a code block data memory 505, wherein each branch of data are read parallel in 2 symbols.

The code block data memory 505 is configured to store code block data which have been subject to bit recovery/bit separation, and do not include the NULL elements, that is, data which have not been subjected to sub-block deinterleaving. The code block data memory stores code block data in three branches, i.e. system bits, the first parity bit and the second parity bit, and each branch of data is stored into two sub-RAMs which respectively store a half of the data of three branches. Storage capacity of sub-RAM shall be greater than half of size of a maximum code block, i.e. 6148/2=3074. In order to cooperate with 8-symbol parallel processing of the de-repetition/de-punching module 503, a bit width of sub-RAM is 8 symbols, and a depth of sub-RAM is 3074/8=385. By using a single port RAM, each of the sub-RAMs simultaneously reads one symbol data, thus (3×2)-symbol parallel processing of the sub-block deinterleaving module can be realized.

Figure 6:
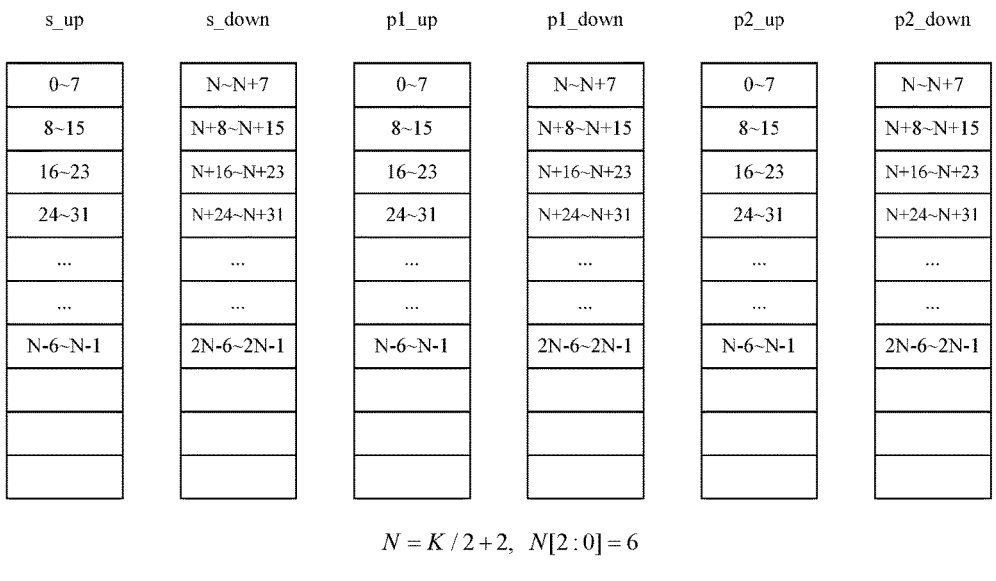
FIG. 6 is a diagram showing stored symbols of all sub-RAMs of a code block data memory when a code block size is odd time of 8 in an embodiment of the present disclosure.

Two sub-RAMs respectively store an upper half part and a lower half part of data of one branch of data which have been subjected to bit recovery/bit separation, denoted by up_ram and dw_ram. The sub-RAM storing upper half part of system bits is named sys_up_ram, and the sub-RAM storing lower half part of system bits is named sys_dw_ram, and the sub-RAMs storing the other two branches of data are named by analogy. According to 3GPP TS36.212, a code block size K must be an integral multiple of 8, and a code block will increase by 4 symbols after Turbo encoding. When K is odd time of 8, the storage capacity of each sub-RAM equals to 6 plus an integral multiple of 8, i.e., only 6 valid symbols are stored at the last address of sub-RAM. In this case, a data format stored in all sub-RAMs is shown in FIG. 6. When K is even time of 8, the storage capacity of each of sub-RAMs pluses 2 on the basis of an integral multiple of 8, i.e., the last address of sub-RAM only stores 6 valid symbols, and in this case, a data format stored in all sub-RAMs are shown in FIG. 7.

The HARQ combination module 506 is configured to combine data output by the sub-block deinterleaving module 504 and the history data output by the HARQ data input module 507. The HARQ combination module 506 adopts (3×2)-symbol parallel processing.

The HARQ data input module 507 is configured to acquire and cache history data to be processed. The HARQ data input module 507 may read data from outside through the data bus, and the cache may be set in the HARQ data input module 507. The cache mechanism in present embodiments is FIFO, data can be read by packets and taken to process while being read, which only requires fewer storage resources.

The HARQ data output module 508 is configured to cache and output HARQ combination results. The HARQ data output module 508 may write data out through the data bus, and the cache may be set in the HARQ data output module 508. The cache mechanism in present embodiments is FIFO, data can be written out by packets, and data which have been subjected to HARQ combination can be stored while being written out, which only requires fewer storage resources.

It is noted that the parameter processing and controlling module 501, the new data input module 502 the de-repetition/de-punching module 503, the sub-block deinterleaving module 504, the HARQ combination module 506, the HARQ data input module 507 and the HARQ data output module 508 in embodiments of the present invention may be realized through an application specific integrated circuit (ASIC) or a field-programmable gate array (FPGA) of an rate dematching apparatus; and the code block data memory 505 may be realized through RAM of the rate dematching apparatus.

Figure 8:
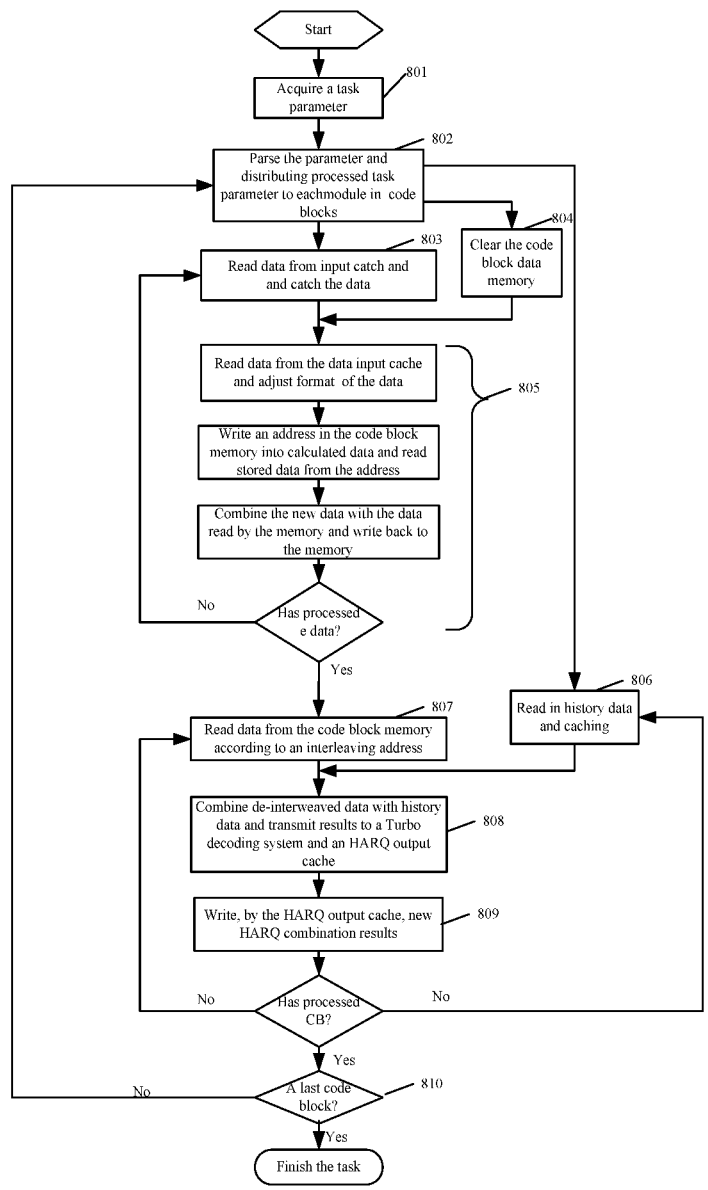
FIG. 8 is a first processing flow diagram showing a method for rate dematching in an embodiment of the present disclosure.

As shown in FIG. 8, a processing flow diagram of a rate dematching method in embodiments of the present disclosure includes steps 801-805.

In step 801 and step 802, a parameter processing and controlling module, acquires a task parameter, calculates and processes the acquired task parameter, and distributes processed task parameter to other modules in code blocks.

In step 803, a new data input module acquires data to be processed from outside and temporarily stores the data, where the data begins with a starting address $k_0$ of code block rate matching output, NULL elements are not included, and the total amount of data of one code block is e symbols. The new data input module may initiate a read request to a data bus when there is a free space in an FIFO cache, and read data of one packet every time; and when a de-repetition/de-punching module requires data, data are taken from the FIFO cache, converted to a bit width of 8 symbols, and transmitted to the de-repetition/de-punching module.

In step 804 and step 805, the de-repetition/de-punching module receives new code block data, and firstly clears code block data memory for the code block. As shown in FIG. 6 and FIG. 7, each of sub-RMAs stores data only starting from the address $$0 \sim \left\lfloor \frac{k/2 + 2}{8} \right\rfloor,$$

so zero clearing code block data memory is only required to be performed on the part of RAM, and zero clearing 6 sub-RAMs is performed simultaneously.

Figure 9:
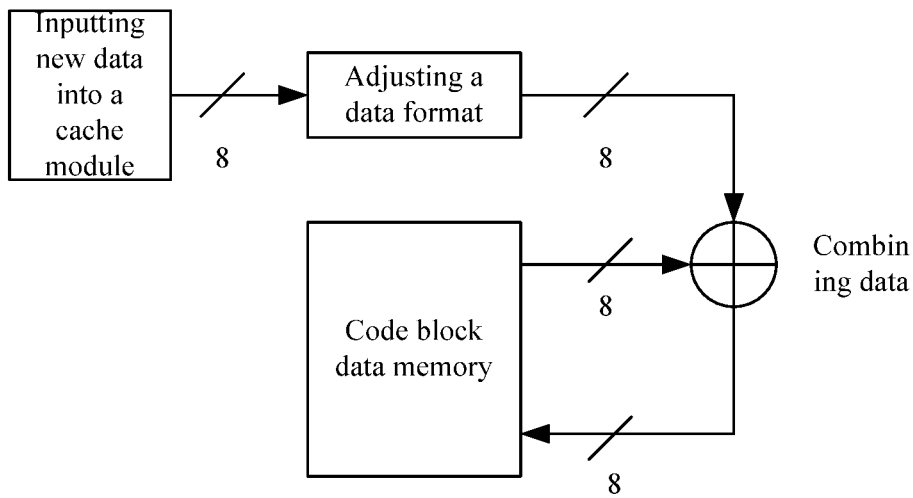
FIG. 9 is a diagram showing de-repetition/de-punching in an embodiment of the present disclosure.

After a code block data memory is cleared, the de-repetition/de-punching module reads data to be processed from the new data input module according to a bit width of 8 symbols, and data read out are adjusted to be aligned in a storage format in RAM; and meanwhile, corresponding addresses of data in RAM are calculated, data in RAM are read from the address and combined with new data, data combined are written back to RAM, where the written address is the same as the read address. A de-repetition/de-punching diagram is shown in FIG. 9. When e new data of a whole code block are all combined and written back, processing of bit recovery and bit separation is completed.

Figure 10:
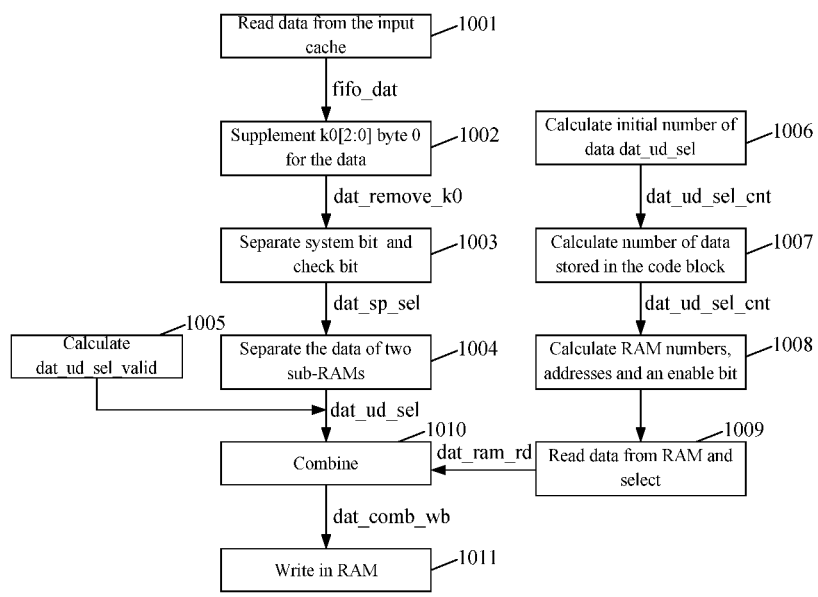
FIG. 10 is a processing flow diagram showing de-repetition/de-punching in an embodiment of the present disclosure.

As shown in FIG. 10, the de-repetition/de-punching process is divided into a plurality of sub-steps, i.e. steps 1001-1011, and the symbol in the following description represents a byte.

Step 1001 to step 1004 are used for adjusting format of new data taken from an input cache.

In step 1001, data are read from the input cache, where the data are denoted by fifo_dat and the upper bytes of the data are ahead.

In step 1002, fifo_dat beginning from (k0-k0[2:0]) are aligned according to a whole 8-byte, i.e., if k0[2:0]!=0, zero padding is applied to a lower byte, and data begin to be generated at a whole 8-byte; and the data are denoted by dat_remove_k0, and the valid data of dat_remove_k0 are more than one beat compared with the valid data of fifo_dat, where one beat includes 8 bytes.

In step 1003, system bits is separated from a parity bit, and after the separation, data are denoted by dat_sp_sel. Since the total number of system bits is (k+4), system bits of dat_remove_k0 are required to be supplemented by 4 bytes of 0 at the last 8-byte position; and after data roll for each circle in a virtual cache, the valid data of dat_sp_sel has one more beat than the valid data of dat_remove_k0.

For a parity bit, data output by rate matching is in an alternate format of P1_P2. But during the rate matching, since a column of P2 in which a NULL element is inserted is different from that P1 in which the NULL element is inserted, positions of bits which are deleted finally are different, causing a position of P1 and P2 exchanged to be a format of p2_P1.

Figure 11:
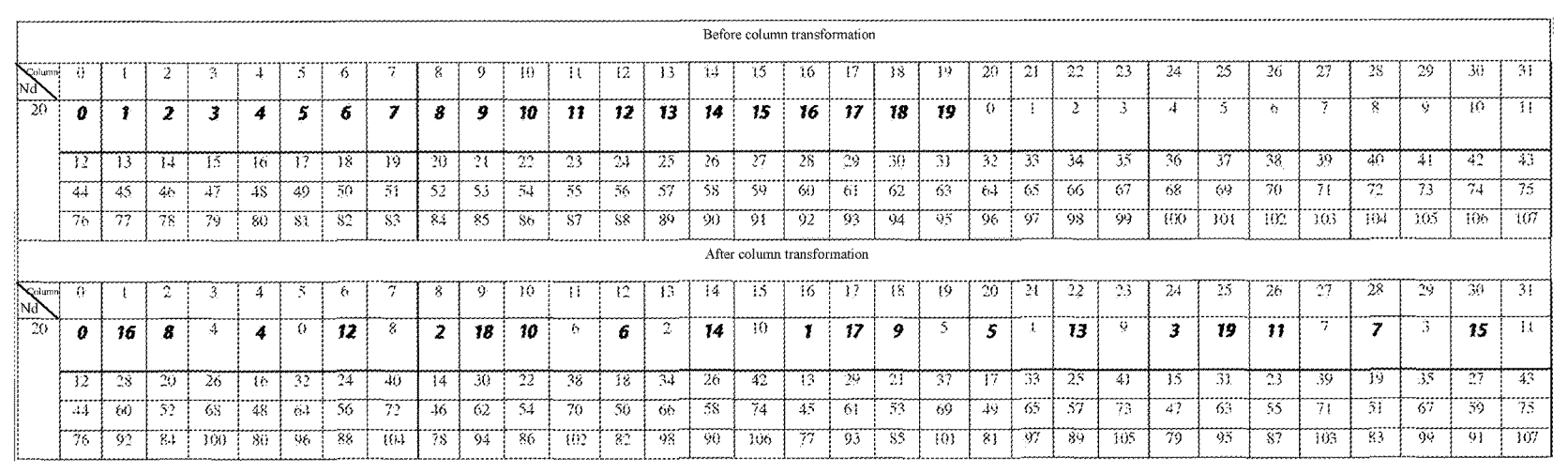
Figure 12:
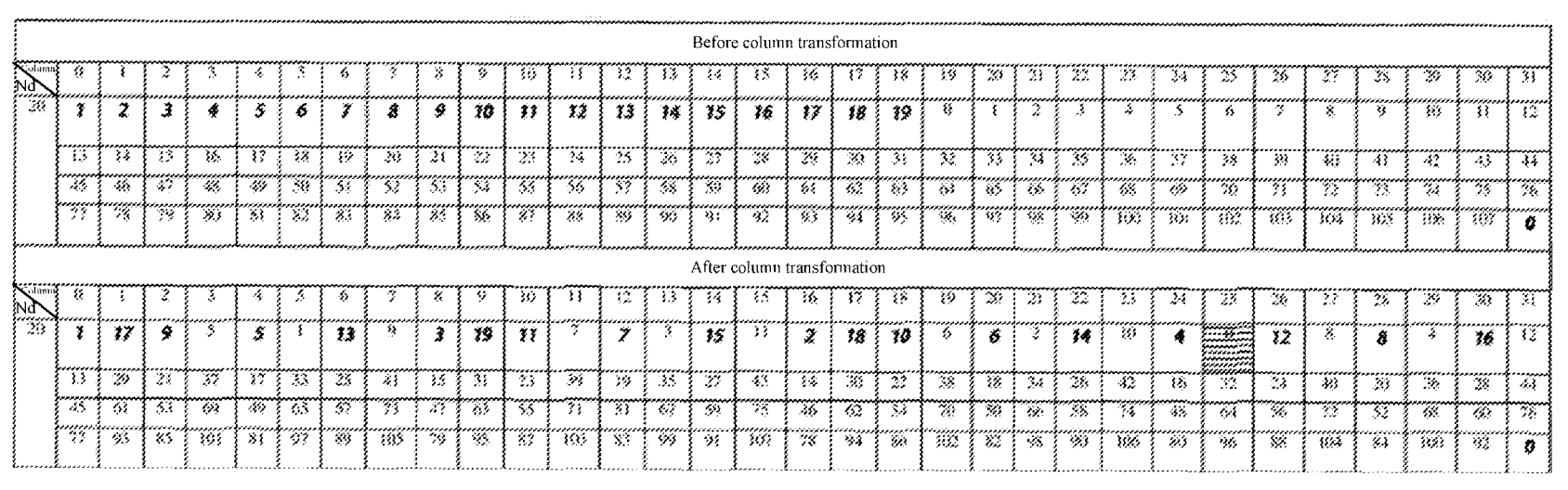

FIG. 11 and FIG. 12 explain situations of exchanging sequences of P1/P2 using the number of NULL elements of nd=20 and R=4 as an example, and bold italics in the FIG. 11 and FIG. 12 indicate serial numbers of NULL elements, and other numbers indicate serial numbers of valid data. In a shadow position of FIG. 12, P1 is a NULL element, and P2 is valid data. When data are output in this way, data are changed to be in a format of P2_P1 until the last parity bit. When dat_sp_sel is required to be adjusted from data in a shaded position, positions of every two bytes data will be exchanged.

In step 1004, data of two sub-RAMs of each branch are separated and denoted by dat_ud_sel. $k_0$ may be in the system bits or in the parity bits, the number of valid symbols of a last address of each of sub-RAMs may be 2 or 6, a virtual cache may also roll during rate matching, and in various cases, the numbers of added zero bytes are different. The number of valid symbols in RAM is denoted by ram_dat_sum, and delay for dat_sp_sel_data is denoted by dat_sp_sel_dly*, wherein * indicates the number of beats of delay. There are several cases in the following.

In case (1), $k_0$ is in system bits and ram_dat_sum[2:0]=2, and rolling has not yet been executed:

in sys_up_ram, dat_ud_sel<=sp_sel_dat_dly1;

6 bytes of 0 are added to the end of sys_up_ram, and dat_ud_sel<={sp_sel_dat_dly1[63:48], 48'd0};

in sys_dw_ram, 6 bytes of 0 have been added, and dat_ud_sel<={sp_sel_dat_dly2[47:0], sp_sel_dat_dly1[63:48]};

6 bytes of 0 shall have been added to an end of sys_dw_ram, but 4 bytes of 0 have already been added in sp separation before, therefore only 2 bytes of 0 are added to an end of sys_dw_ram here, and dat_ud_sel<={sp_sel_dat_dly2[47:0], 16'd0};

in p_up_ram, 8 bytes of 0 have been added before, i.e., delay by one beat, dat_ud_sel<=sp_sel_dat_dly2;

at the end of p_up_ram, (k+4) data are stored in p_up_ram; finally, there are four valid data and four added bytes of 0 in the end of p_up_ram; dat_ud_sel<={sp_sel_dat_dly2[63:32], 32'd0};

in p_dw_ram, 12 bytes of 0 have been added before; dat_ud_sel<={sp_sel_dat_dly3[31:0], sp_sel_dat_dly2[63:32]};

4 bytes of 0 are added to the end of p_dw_ram; dat_ud_sel<={sp_sel_dat_dly3[31:0], 32'd0};

in sys_up_ram which has been subjected to the first roll, 16 bytes of 0 have been added before, i.e., delay by two beats; dat_ud_sel<=sp_sel_dat_dly3;

then the above process is repeated; two beats are added for each roll delay.

In case (2), $k_0$ is in system bits and ram_dat_sum[2:0]=6, and rolling has not yet been executed:

in sys_up_ram, dat_ud_sel<=sp_sel_dat_dly1;

2 bytes of 0 are added to the end of sys_up_ram, and dat_ud_sel<={sp_sel_dat_dly1[63:16], 16'd0};

in sys_dw_ram, 2 bytes of 0 have been added, and dat_ud_sel<={sp_sel_dat_dly2[15:0] and sp_sel_dat_dly1[63:16]};

2 bytes of 0 shall have been added to an end of sys_dw_ram, but 4 bytes of 0 have been already added in sp separation before, therefore 0 is not required to be added to an end of sys_dw_ram here, and dat_ud_sel<={sp_sel_dat_dly2[15:0], sp_sel_dat_dly1[63:16]; 0 added herein is offset;

in p_up_ram, 0 has not been added before; dat_ud_sel<=sp_sel_dat_dly1;

at the end of p_up_ram, (k+4) data are stored in p_up_ram, finally, there are four valid data, four bytes of 0 are added and dat_ud_sel<={sp_sel_dat_dly1[63:32], 32'd0};

in p_dw_ram, 4 bytes of 0 have been added before; dat_ud_sel<={sp_sel_dat_dly2[31:0], sp_sel_dat_dly1[63:32]};

4 bytes of 0 are added to an end of p_dw_ram; dat_ud_sel<={sp_sel_dat_dly2[31:0], 32'd0}; and in sys_up_ram which has been subjected to the first roll, 8 bytes of 0 have been added before, i.e., delay by one beat; dat_ud_sel<=sp_sel_dat_dly2.

Then the above process is repeated; and one beat is added for each roll delay.

In case (3), $k_0$ is in parity bits and ram_dat_sum[2:0]=2, and rolling has not yet been executed:

in p_up_ram, dat_ud_sel<=sp_sel_dat_dly1;

at an end of p_up_ram, (k+4) symbols are stored in p_up_ram; finally, there are four valid symbols, 4 bytes of 0 are added; dat_ud_sel<={sp_sel_dat_dly1[63:32], 32'd0};

in p_dw_ram, 4 bytes of 0 have been added before, and dat_ud_sel<={sp_sel_dat_dly2[31:0], sp_sel_dat_dly1[63:32]};

at the end of p_dw_ram, 4 bytes of 0 are added; dat_ud_sel<={sp_sel_dat_dly2[31:0], 32'd0};

in sys_up_ram which has been subjected to first roll, 8 bytes of 0 have been added before, i.e., delay by one beat; dat_ud_sel<=sp_sel_dat_dly2;

at the end of sys_up_ram which has been subjected to first roll, 6 bytes of 0 are added, and dat_ud_sel<={sp_sel_dat_dly2[63:48], 48'd0};

in sys_dw_ram which has been subjected to first roll, 14 bytes of 0 have been added before, and dat_ud_sel<={sp_sel_dat_dly3[47:0], sp_sel_dat_dly2[63:48]};

at the end of sys_dw_ram which has been subjected to first roll, 6 bytes of 0 shall be added here, but 4 bytes of 0 have been added in sp separation, therefore 2 bytes of 0 are added, and dat_ud_sel<={sp_sel_dat_dly3[47:0], 16'd0};

at the end of p_up_ram which has been subjected to first roll, 16 bytes of 0 have been added before, dat_ud_sel<=sp_sel_dat_dly3.

Then the above process is repeated; and two beats are added for each roll delay.

In case (4), $k_0$ is in parity bits and ram_dat_sum[2:0]=6, and rolling has not yet been executed:

in p_up_ram, dat_ud_sel<=sp_sel_dat_dly1;

at the end of p_up_ram, (k+4) symbols are stored in p_up_ram, finally, there are four valid symbols, 4 bytes of 0 are added, and dat_ud_sel<={sp_sel_dat_dly1[63:32], 32'd0};

in p_dw_ram, 4 bytes of 0 have been added before, and dat_ud_sel<={sp_sel_dat_dly2[31:0], sp_sel_dat_dly1[63:32]};

at the end of p_dw_ram, 4 bytes of 0 are added; dat_ud_sel<={sp_sel_dat_dly2[31:0], 32'd0};

in sys_up_ram which has been subjected to first roll, 8 bytes of 0 have been added before, i.e., delay by one beat, and dat_ud_sel<=sp_sel_dat_dly2;

at the end of sys_up_ram which has been subjected to first roll, 2 bytes of 0 are added, and dat_ud_sel<={sp_sel_dat_dly2[63:16], 16'd0};

in sys_dw_ram which has been subjected to first roll, 10 bytes of 0 have been added before, and dat_ud_sel<={sp_sel_dat_dly3[15:0], sp_sel_dat_dly2[63:16]};

at the end of sys_dw_ram which has been subjected to first roll, 2 bytes of 0 shall be added here, but 4 bytes of 0 have been added in sp separation, therefore 0 is not required to be added, and dat_ud_sel<={sp_sel_dat_dly3[15:0], sp_sel_dat_dly2[63:16]}; 8 bytes 0 are in total added herein;

at the end of p_up_ram which has been subjected to first winding, 8 bytes of 0 have been added before, dat_ud_sel<=sp_sel_dat_dly2.

Then the above process is repeated; and one beat is added for each winding delay.

In practice, $k_0$ is not necessarily in up_ram. However, in the above processing, even if beginning from dw_ram, data are completed by a number of bytes of 0 in case of beginning from up_ram; with a number of bytes of 0 supplemented for dat_remove_k0 and dat_sp_sel, the data format of dat_ud_sel produced finally must be consistent with a data format stored in RAM.

In step 1005, a mark of valid data of dat_ud_sel denoted by dat_ud_sel valid is calculated.

The number of bytes 0 added in the processing course of ud separation is indicated with a counter ud_add_dat_cnt.

At the starting position, 0 is added only when data are in dw_ram. When $k_0$ is in sys_dw_ram, if ram_dat_sum[2:0]=2, 6 bytes of 0 are added at the starting position; and if ram_dat_sum[2:0]=6, 2 bytes of 0 are added at the starting position. When $k_0$ is in p_dw_ram, 4 byte of 0 are added at the starting position.

In the data processing course, if ram_dat_sum[2:0]=2, 6 bytes of 0 are added at each end of sys_up_ram; 2 bytes of 0 are added at an end of sys_dw_ram; 4 bytes of 0 are added at the end of p_up_ram or p_dw_ram. If ram_dat_sum [2:0]=6, only 4 bytes of 0 are added at the end of p_up_ram or p_dw_ram.

According to ud_add_dat_cnt/8, added beats of data of up_sel_dat relative to sp_sel_dat can be known. However, the number of added beats of data at dat_remove_k0 and dat_sp_sel is respectively calculated in steps 1002 and 1003, and dat_ud_sel_valid is obtained by accumulating the three.

Steps 1006-1009 are used for calculating a position of data dat_ud_sel in RAM and reading data in RAM from the position.

Data are stored in RAM by sub-blocks; a bit width of sub-RAMs is 8 symbols (8 bytes), and (k/2+2) valid symbols are stored. 8-byte parallel processing is adopted for data processing. The valid data in RAM are numbered beginning with sys_up_ram in every 8 bytes. For the system bits, a upper sub-RAM and a lower sub-RAM respectively store data of $$M = \left\lceil \frac{k/2 + 2}{8} \right\rceil$$

units; for parity bits, p1/p2 alternate processing exists; there are 4 bytes of p1 and 4 bytes of p2 in every 8 bytes, that is, there are data from two units in one address of each RAM.

When lowest 3 bits of (k/2+2) are 2, (2M−1) processing units exist in one parity bit RAM, and a storage structure of addressing of all sub-RAMs according to a processing unit is shown in FIG. 13.

When lowest 3 bits of (k/2+2) are 6, 2M processing units exist in one parity bit RAM, and a storage structure of addressing of all sub-RAMs according to a processing unit is shown in FIG. 14.

FIG. 13 and FIG. 14 reveals that sub-RAM of the data, addresses of data in sub-RAM and enabled bits can be calculated through number values. Finally, a datum of the storage structure in sub-RAM is adjusted as up_sel_dat, and a unit number value of up_sel_dat may be calculated, where the unit number is denoted by dat_ud_sel_cnt. Steps are as follows.

In step 1006, an initial number value of data dat_ud_sel is calculated. If data of full 8 bytes are stored in each sub-RAM, k0 [14:3] may be regarded as an initial unit number of input data. But in the processing course, zero adding processing is made on dat_remove_k0, i.e., the data firstly written into RAM is data before dat_remove_k0, causing the number to move forward; on the other hand, valid data is not fully written in the valid address of sub-RAM; fewer 0 may be added to each end of sub-RAM and parts of data are delayed to a next unit, causing the number to move backward; a true starting unit number is determined in combination of two influences. There are several cases as follows.

I. Starting from sys_up_ram, both the two influences do not exist and a starting number is k0 [14:3].

II. Starting from sys_dw_ram, dat_ud_sel needs to add $$\left(8 - \left\{\frac{k}{2} + 2\right\}[2:0]\right)$$

bytes of 0 in front of dat_remove_k0, but because the last valid address of sys_up_ram is not fully occupied, data delays $$\left(8 - \left\{\frac{k}{2} + 2\right\}[2:0]\right)$$

bytes, so two influences are counteract by each other; and the starting number is k0 [14:3].

III. Starting from p_up_ram, if ram_dat_sum[2:0]=2, 12 bytes are delayed in sys_ram; 4 bytes of 0 added by the first beat of data in sp separation offsets a part of delay, so a total of 8 bytes are delayed. Therefore, finally, the starting number is (k0 [14:3]+1).

If ram_dat_sum[2:0]=6, a total of 4 bytes are delayed in sys_ram; 4 bytes of 0 are added by the first beat of data in sp separation, and two influences are counteract by each other; and the starting number is k0 [14:3].

IV. Starting from p_dw_ram, 4 beats are delayed at an end of p_up_ram compared with starting from p_up_ram, but 4 bytes of 0 are added, so the two influences are counteract by each other. Therefore, results of starting from p_dw_ram is the same as results of starting from p_up_ram, i.e., when ram_dat_sum[2:0]=2, the starting number is k0 [14:3]+1 and when ram_dat_sum[2:0]=6, the starting number is k0 [14:3].

In step 1007, dat_ud_sel_cnt is calculated. An initial value is already obtained in step 1006, and whenever dat_ud_sel is valid, i.e., when dat_ud_sel_valid is 1, the dat_ud_sel_cnt is added by 1. The value of dat_ud_sel_cnt returns zero when the value of dat_ud_sel_cnt reaches a maximum. When a mantissa of ram_dat_sum is 2, the maximum value of dat_ud_sel_cnt is (6M−3), otherwise, the maximum value of dat_ud_sel_cnt is (6M−1).

In step 1008, RAM numbers, addresses and enabled bits are calculated through ud_sel_dat_cnt. As mentioned previously, by comparing the unit number with $$M = \left\lceil \frac{k/2 + 2}{8} \right\rceil$$

and combined with value of ram_dat_sum[2:0], a result is obtained from FIG. 13 and FIG. 14.

In step 1009, data read from a RAM address obtained in step 1008 are denoted by dat_ram_rd.

In step 1010, dat_ram_rd and new data dat_ud_sel in an adjusted format are summed and a summing result is denoted by dat_comb_wb.

In step 1011, dat_comb_wb is written back to the RAM original position calculated in step 1008.

Above steps implement bit recovery and bit separation. A same method including the above method is only needed to process e data of a code block without differentiating de-repetition or de-punching or recovering NULL elements.

In step 806, an HARQ data input module acquires history data from outside and temporarily stores the history data. The data have been subjected to sub-block deinterleaving and include three branches which include system bits, first parity bit and second parity bit. The data do not include NULL elements. The HARQ input module can initiate a read request to a data bus when there is a spare space in an FIFO buffer, and read data of one packet every time. When an HARQ combination module needs data, the data are taken from the FIFO buffer, converted to data having a bit width having 3×2 symbols. The data having a bit width having 3×2 symbols are transmitted to the HARQ combination module.

In step 807, the sub-block deinterleaving module calculates a sequence of output data which have been subjected to sub-block interleaving, concurrently reads three branches of new data from a code block data memory, where each branch of new data has 2 symbols, and the data read from a code block data memory are transmitted to the HARQ combination module.

Because the sub-block deinterleaving module has no buffer, sub-block deinterleaving reads data from the code block data through an index j in a one-to-one correspondence i←→j between index addresses before and after sub-block interleaving. The data are output to the position of an index i before interleaving so as to finish sub-block deinterleaving, i.e., adopting an interleaving read mode. So a key of sub-block deinterleaving is to realize transformation of interleaving indexes of i→j.

Specially, an i th element in a CB before interleaving is denoted by a serial number of the i th element in a matrix before interleaving after adding a NULL element. i' can be obtained by i and then j is obtained. Apparently, i→i' is determined by the number of NULL elements, i.e., i'=i+$N_D$; but i'→j is related to the total number of NULL elements before (and at) a column of i'. A correction factor S related to $N_D$ is introduced, and j=f(i', S) is denoted.

Known from a sub-block interleaving algorithm:

$$f(i', S)=P(i'[4:0])*R+i'[12:5]-S(P(i'[4:0]))$$

The correction factor S is related to $N_D$. For interlaced matrixes, the NULL elements are mixed in each column. A relationship among system bits, the correction factor S and the column number of the first parity bit and $N_D$ obtained from a column transformation relationship is shown in FIG. 15.

For a second parity bit, a calculating process is consistent, but a relational expression may differ, wherein the relational expression is as follows:

$$i'=i+N_D-1$$

$$j=P(i'[4:0])*R+i'[12:5]-S'(P(i'[4:0]))$$

A relationship among the correction factor S and the column number of the second parity bit and $N_D$ is shown in FIG. 16.

An index transformation relationship of each branch of data i→j can be obtained from above steps.

On the other hand, the system bits and the parity bit are independent. To accelerate processing speed, de-interleaving operations are executed parallel on three branches of data. In present embodiments, odd and even symbols of each branch are simultaneously processed. If odd and even symbols before interleaving exist in different sub-RAMs, degree of parallelism may be further increased. Each column of sub-block interleaving has 32 columns. Therefore, if the column number before interleaving is an even number, i is also an even number. Column transformation of LTE sub-block interlacing is shown in FIG. 17. As shown in FIG. 17, for the system bits and the first parity bit, when i is an even number, the column numbers are less than or equal to 15 after the interleaving, i.e., at a first half part of the matrix; when i is an odd number, the column numbers are greater than or equal to 16 after the interleaving, i.e., at a second half part of the matrix.

For the second parity bit, operation of circular displacement exists, and the column transformation relationship is shown in FIG. 18. As shown in FIG. 18, for the second parity bit, when i is an even number, the column numbers are greater than or equal to 16 after the interleaving, i.e., at a second half part of the matrix; when i is an odd number, the column numbers are less than or equal to 15 after the interleaving, i.e., at a first half part of the matrix.

As mentioned previously, each branch of data is stored in an upper part and a lower part in a sequence before sub-block interleaving. Therefore, parity parallel processing is possible, and finally, 6-symbol parallel processing is achieved. A corresponding relation between each branch of data and sub-RAM is:

Even symbol of system bits is in sys_up_ram;
Odd symbol of system bits is in sys_dw_ram;
Even symbol of first parity bit is in p1_up_ram;
Odd symbol of first parity bit is in p1_dw_ram;
Even symbol of second parity bit is in p2_dw_ram; and
Odd symbol of second parity bit is in p2_up_ram.

Data which have been subjected to sub-block deinterleaving are firstly combined with the history data of the code block, the combined data are transmitted to a Turbo decoder and written to the outside for a next HARQ process. The history data come from the data bus, and the combined data are also written out through the data bus. Reading data from the bus and writing data to the bus are not necessarily continuous. Therefore, a processing pipeline of sub-block deinterleaving may be suspended at any time.

To simplify processing, the sub-block deinterleaving module adopts a data packet for unit operation, i.e., one sub-pack data are continuously taken from the code block memory every time and executed sub-block deinterleaving, and sub-packs are not suspended. After processing of the sub-pack, the HARQ combination module is checked for a data request, and then a next sub-pack is processed. The HARQ combination module is required to initiate a data processing request to the sub-block deinterleaving module only when at least data of one sub-pack exist in the HARQ data input module and at least a vacant space for accommodating data of one sub-pack exists in the HARQ data output module. To eliminate a bubble between two sub-packs, a request of a next sub-pack can be accepted when processing of one sub-pack is not finished. For matching with the mechanism, a history request counter is arranged for sub-block deinterleaving. Whenever a request is received, a length of the sub-pack is added. When the counter is not zero, an interleaving address can be calculated and data is read from the code block memory. When 3×2 symbols are processed once, the data counter decreases 1.

In step 808, the HARQ combination module reads the history data from the HARQ data input module, and combines the history data with output data of sub-block deinterleaving. Results are outputted to an external decoding module as well as the HARQ data output module. Whether applying HARQ combination and outputting combination results can be configured in task parameters for enhancing application flexibility of the apparatus in the system.

In step 809, the HARQ data output module temporarily stories the HARQ combination results and writes the HARQ combination results to the outside. The module converts data of bit width of 3×2 symbols inputted by the HARQ combination module into data of system bits width and writes the data into an FIFO buffer. The HARQ output module initiates a writing request to a data bus when there is adequate data in an FIFO buffer, and writes data of one packet every time; and when the FIFO buffer will be fully written, the HARQ combination module is notified to suspend operation for preventing FIFO overflow.

In step 810, when data of one code block is fully written, processing of the code block is finished. If the code block is a last code block in a rate dematching task, the task is finished; otherwise, a next code block continues to be processed.

In conclusion, the rate dematching method of embodiments of the present disclosure can be summarized as a processing flow shown in FIG. 19.

In step 1901, new data to be processed are acquired, bit recovery/bit separation are performed on the new data to be processed, and data which have been subjected to bit recovery/bit separation are written into a code block data memory.

In step 1902, sub-block deinterleaving processing is applied to data stored in the code block data memory.

In step 1903, HARQ combination processing are applied to output data which have been subjected to sub-block deinterleaving processing and acquired history data to be processed, and HARQ combination results are outputted.

In addition, embodiments of the present disclosure also provide a receiving-side device for data communication, including the rate dematching apparatus of any one of the above-mentioned embodiments. For a downlink traffic channel, the receiving-side device may be eNodeB; and for a uplink traffic channel, the receiving-side device may be UE.

Embodiments of the present disclosure also provide a non-transitory computer readable storage medium, including a set of computer executable instructions for executing the rate dematching method of any one of the above-mentioned embodiments of the present disclosure.

The above only describes preferred embodiments of the present disclosure and is not intended to limit a protection scope of the present disclosure.

What is claimed is:

1. A rate dematching method, comprising:
a receiving side acquiring new data to be processed from a transmitting side, performing bit recovery and bit separation on the new data to be processed, and writing data which have been subjected to the bit recovery and bit separation into a code block data memory;
applying sub-block deinterleaving processing to data stored in the code block data memory; and
applying hybrid automatic repeat request (HARQ) combination processing to output data which have been subjected to sub-block deinterleaving processing and acquired history data to be processed, and outputting HARQ combination results to a decoder to be decoded;
wherein performing bit recovery and bit separation on the new data to be processed, and writing data which have been subjected to the bit recovery and bit separation into a code block data memory comprise:
when processing each code block, zero clearing the code block data memory, reading data from the code block data memory, combining data read from the code block memory and the new data acquired, applying bit separation to combined data, and writing data which have been subjected to bit separation into the code block data memory.

2. The rate dematching method according to claim 1, wherein the code block data in the code block memory are stored in three branches which comprise system bits, a first parity bit and a second parity bit,
a first half part of each branch of data which have been subjected to bit separation is stored into one sub-memory, a second half part of each branch of data which have been subjected to bit separation is stored into another sub-memory, and the three branches of data are stored in a total of six sub-memories.

3. The rate dematching method according to claim 1, wherein the sub-block deinterleaving processing comprises:
calculating a sequence of data having been subjected to sub-block interleaving according to a sequence of output data which have been subjected to the sub-block deinterleaving, obtaining an address of the output data in the code block data memory, and reading out data.

4. A rate dematching apparatus, configured on a receiving side, comprising:
a parameter processing and controlling module, configured to acquire a task parameter, parse and process the task parameter and distribute the task parameters to other modules;
a new data input module, configured to acquire new data to be processed from a transmitting side and cache the new data to be processed;
a de-repetition and de-punching module, configured to perform bit recovery and bit separation on the new data to be processed, and write data which have been subjected to the bit recovery and bit separation into a code block data memory;
the code block data memory, configured to store the data which have been subjected to the bit recovery and bit separation;
a sub-block deinterleaving module, configured to apply sub-block deinterleaving processing to data stored in the code block data memory;
a hybrid automatic repeat request (HARQ) data input module, configured to acquire and cache history data to be processed;
an HARQ combination module, configured to combine data output by the sub-block deinterleaving module and the history data output by the HARQ data input module; and
an HARQ data output module, configured to cache and output HARQ combination results to a decoder to be decoded;
wherein performing bit recovery and bit separation on the new data to be processed, and writing data which have been subjected to bit recovery and bit separation into a code block data memory comprise:
when processing each code block, by the de-repetition and de-punching module, zero clearing the code block data memory, reading data from the new data input module and the code block data memory simultaneously, and applying bit separation to combined data, and writing data which have been subjected to bit separation into the code block data memory.

5. The rate dematching apparatus according to claim 4, wherein the code block data memory is configured to store code block data in three branches which comprise system bits, a first parity bit and a second parity bit,
a first half part of each branch of data which have been subjected to bit separation is stored into one sub-memory, a second half part of each branch of data which have been subjected to bit separation is stored into another sub-memory, and the three branches of data are stored in a total of six sub-memories.

6. The rate dematching apparatus according to claim 4, wherein the sub-block deinterleaving module is configured to calculate a sequence of the output data which have been subjected to sub-block interleaving according to a sequence of output data, obtain an address of the output data in the code block data memory, and read out data.

7. A receiving-side device for data communication, comprising the rate dematching apparatus of claim 4.

8. A receiving-side device for data communication, comprising the rate dematching apparatus of claim 5.

9. A receiving-side device for data communication, comprising the rate dematching apparatus of claim 6.

10. A non-transitory computer-readable storage medium, configured on a receiving side, comprising a set of computer executable instructions for executing a rate dematching method-which comprises:
  acquiring new data to be processed from a transmitting side, performing bit recovery and bit separation on the new data to be processed, and writing data which have been subjected to the bit recovery and bit separation into a code block data memory;
  applying sub-block deinterleaving processing to data stored in the code block data memory; and
  applying hybrid automatic repeat request (HARQ) combination processing to output data which have been subjected to sub-block deinterleaving processing and acquired history data to be processed, and outputting HARQ combination results to a decoder to be decoded;
  wherein performing bit recovery and bit separation on the new data to be processed, and writing data which have been subjected to the bit recovery and bit separation into a code block data memory comprise:
  when processing each code block, zero clearing the code block data memory, reading data from the code block data memory, combining data read from the code block memory and the new data acquired, applying bit separation to combined data, and writing data which have been subjected to bit separation into the code block data memory.

11. The non-transitory computer-readable storage medium according to claim 10, wherein the code block data in the code block memory are stored in three branches which comprise system bits, a first parity bit and a second parity bit,
  a first half part of each branch of data which have been subjected to bit separation is stored into one sub-memory, a second half part of each branch of data which have been subjected to bit separation is stored into another sub-memory, and the three branches of data are stored in a total of six sub-memories.

12. The non-transitory computer-readable storage medium according to claim 10, wherein the sub-block deinterleaving processing comprises: calculating a sequence of data having been subjected to sub-block interleaving according to a sequence of output data, obtaining an address of the output data in the code block data memory, and reading out data.

* * * * *